(12) United States Patent
Pollard et al.

(10) Patent No.: US 6,256,624 B1
(45) Date of Patent: Jul. 3, 2001

(54) COMPUTING SYSTEM FOR OPERATING REPORT PRODUCTION FACILITIES

(75) Inventors: Larry C. Pollard, Highlands Ranch; Kurtis A. Haufschild, Littleton; Larry M. Rebenack, Boulder, all of CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/135,349

(22) Filed: Aug. 17, 1998

(51) Int. Cl.[7] ............................. G06F 7/00; G06F 17/30
(52) U.S. Cl. ........................... 707/3; 707/10; 707/104; 705/35; 709/217; 382/190
(58) Field of Search .................... 707/3, 7, 204, 707/10; 705/34, 401, 410, 411, 406, 40; 709/217

(56) References Cited

U.S. PATENT DOCUMENTS

| | | | |
|---|---|---|---|
| 4,639,873 | * 1/1987 | Baggarly et al. | 364/466 |
| 4,713,761 | 12/1987 | Sharpe et al. | 364/406 |
| 4,941,091 | 7/1990 | Breault et al. | 364/406 |
| 5,202,834 | 4/1993 | Gilham | 364/464.02 |
| 5,226,112 | * 7/1993 | Mensing et al. | 395/114 |
| 5,287,194 | * 2/1994 | Lobiondo | 358/296 |
| 5,287,270 | 2/1994 | Hardy et al. | 364/408 |
| 5,325,290 | * 6/1994 | Cauffman et al. | 364/401 |
| 5,337,258 | * 8/1994 | Dennis | 364/551 |
| 5,437,024 | * 7/1995 | French | 395/600 |
| 5,652,842 | * 7/1997 | Siegrist, Jr. et al. | 395/202 |
| 5,655,089 | 8/1997 | Bucci | 395/240 |
| 5,684,965 | 11/1997 | Pickering | 395/234 |
| 5,699,416 | 12/1997 | Atkins | 379/127 |
| 5,699,528 | 12/1997 | Hogan | 395/240 |
| 5,841,658 | * 11/1998 | Bouchard | 364/464 |
| 5,918,220 | * 6/1999 | Sansone et al. | 705/408 |
| 5,943,656 | * 8/1999 | Crooks et al. | 705/30 |

* cited by examiner

*Primary Examiner*—Thomas Black
*Assistant Examiner*—Jacques Veillard
(74) *Attorney, Agent, or Firm*—Marsh Fischmann & Breyfogle, LLP

(57) ABSTRACT

The disclosure includes a computational system (110) that implements a method for controlling operation of report production facilities. The system (110) is particularly suited to efficiently operating a facility that prints mail pieces and inserts the mail pieces in envelopes for delivery by the U.S. Postal Service. In one implementation, the system (110) includes a main processor (112) that receives constituent data and sequentially stores the data in report recipient files (116). The main processor (112) is utilized to process the stored data to create relational database files (118, 120). The database files (118, 120) include index fields which facilitate tracking and sorting of the data based in part upon postal rates, report lengths, and other distribution and production criteria. The main processor (112) may then be operated to create report output files (160) to be used by a report production facility (160) in printing and inserting the mail pieces. The report output files (160) may be created to obtain lower postal rates through presorting into postal discount categories such as carrier routes and zip code classifications. The report data may be located in the report recipient files (116), without further sequential processing, through the use of location data stored in the database files. The system (110) may further include a scheduler program (114) that controls creation of a report output file (122) by monitoring operational capacities of a report production facility (160), customer requirements via a system operator (124), and the contents of the database files (118, 120).

33 Claims, 3 Drawing Sheets

FIG. 2

OUTPUT INDEX FIELDS
INDEX RECORD

| ACCOUNT NUMBER | STORAGE POSITION DATA | POSTAL CATEGORY | OUTPUT FORMAT | REPORT LENGTH | STATE | TRANSMITTAL VERIFICATION |

FIG. 3

INDEX COUNT FIELDS
INDEX COUNT RECORD

| REPORT LENGTH #1 | REPORT LENGTH #2 | HEAVY MAILING | FOREIGN MAILING | CARRIER ROUTE #1 | CARRIER ROUTE #2 | 5-DIGIT ZIP CODE #2 | 3-DIGIT ZIP CODE #1 | 3-DIGIT ZIP CODE #2 |

COMPUTING SYSTEM FOR OPERATING REPORT PRODUCTION FACILITIES

FIELD OF THE INVENTION

This invention generally relates to the production of information reports, i.e., bills, advertisements, and informational flyers, for delivery through a delivery system to a large number of report recipients. In particular, the present invention relates to a method and apparatus for scheduling the production of information reports at report production facilities for distribution via mass mailings. The present invention is particularly useful in efficiently utilizing printing devices and mechanical and non-mechanical inserting stations at these facilities and in producing the information reports so as to obtain more desirable distribution rates.

BACKGROUND OF THE INVENTION

Increasingly, corporate, nonprofit, and political entities rely on the distribution of information reports to communicate with existing and prospective constituents. While report uses may vary significantly, many entities utilize these reports for billing, advertising, and providing other information. The quantity of these reports distributed is sometimes extremely large and may be in the millions for entities such as credit card, utility, and telecommunications companies. Additionally, many entities need to communicate with their constituents on a monthly (e.g., for billing) or more frequent basis. The large quantity of reports and the repetitive nature of report distributions have caused many entities to devote considerable effort to managing the efficiency and cost of delivery and production of these reports. As can be appreciated, even a small reduction in cost, such as a fraction of a cent, on each report delivered to a constituent (e.g., report recipient) may noticeably effect the total report distribution cost, as the savings are multiplied by the number of report recipients.

In this regard, the delivery cost may constitute a large proportion of the total report distribution cost. Therefore, even a small percentage reduction in the delivery cost per report will significantly reduce the total distribution cost. The delivery cost per report is generally set by the delivery system selected to deliver the reports to report recipients. These delivery systems may include private orpublic (e.g., the U.S. Postal Service) parcel delivery systems and Internet communication services. As may be appreciated, the delivery cost may be based on characteristics of the report such as length, weight, and shape of hard copies and destination. Additionally, delivery systems may offer discounted rates based on volume or on reduced sorting (e.g., the reports have been presorted into classifications defined by the delivery system). Accordingly, entities presently strive to obtain lower rates by controlling the report characteristics such as size and weight and by managing the volume of reports distributed.

To further control distribution costs, efforts have been made to maintain or reduce production costs which include costs for labor, data processing, printing, and assembly (e.g., collation, separation, folding, and insertion in envelopes). Automation of many of the printing and assembling tasks has been used to control costs in report production facilities that produce paper or hard copies of, for example, bills or advertisements. For example, many report production facilities employ computer-controlled printers that feed automated insertion machines (e.g., inserters) which take the printed reports from an input bin, process the reports to fit envelopes having a specified size, and insert processed reports into envelopes. Although automation of these tasks has improved report production costs, efforts are continuing to optimize the computer systems used in the production process to provide additional reductions in production costs and to efficiently operate the printers and inserters.

Because data processing costs also contribute to report production costs, enhancements of current data processing methods are desirable in reducing the cost of distributing the information reports. Data processing costs generally consist of computer system costs for hardware and software (including initial development, maintenance, and processing time) and labor costs for personnel training, data entry, and data and/or program manipulation while processing data into a file (e.g., report output file) for use by the printers in the report production facility. Typically, the existing data processing systems have been incrementally developed to accommodate both the ongoing and continuous nature of data (e.g., report data) being input from internal or external sources and the format of the received report data. With the development of the data processing systems being driven by the incoming report data, inefficiencies in data processing of report data have been created, especially in the ability to control the contents of the report output file transmitted to the report production facility, and the inefficiencies have resulted in higher report distribution costs.

In this regard, the case of a business with monthly billing is illustrative. Typically, the business will divide its client list into two or more groups to facilitate the staggering of production and distribution of bills. For example, the business may choose to have four billing cycles per month, i.e., approximately one fourth of the customers will be billed each week. The business generally will establish, or contract with, a processing center to collect and store billing information, such as information regarding telephone calls or credit card transactions, for each client (e.g., report recipient). Then on a weekly basis, the processing center transmits to a computation center one month's billing information, or report data, for report recipients belonging to a particular billing cycle group. The report data includes all the information necessary to prepare and distribute each bill, including the address of the recipient and the output format or media type. The report data generally is transmitted in file(s) containing non-linked, sequential lines of formatted data. The computation center stores the report data, sequentially processes the report data a number of times to create each report output file, and then transmits these batch files to the report production facility. The report output files may be created so as to group the bills according to the bill output format which may include formats for varying languages (e.g., Spanish or English), length, and style. Next, the report production facility prints copies of the bills from the report output files, inserts the bills in envelopes, and transfers the envelopes to a delivery system, such as the U.S. Postal Service, for delivery to the report recipients.

In the described system, the sequential processing of the file containing the lines of report data is repeated for each output format to create separate report output files. The total processing time is a finction of repeated processing of the lines of data that are not selected during previous processing runs. The cost for repeated sequential processing is significant for businesses whose billing cycles contain millions of clients requiring multiple gigabytes of computer memory to store billing information. In addition, the processing becomes more complex and costly when the business operates more than one processing center to collect data in different geographical areas and more than one report production facility through a single computation center. Further, the quantity and format of the received report data make it difficult and expensive to control the content of the report output file because creation of report output files containing different groupings of bills requires additional sequential processing of the set or subsets of the report data.

SUMMARY OF THE INVENTION

The present inventors recognize the need for a computing system which is operable to efficiently manage operation of a report production facility being employed to print and process reports for distribution to report recipients via a delivery system. Efficient management may include the desire to lower report production and distribution costs and to selectively produce reports containing report data for specific clients (e.g., report recipients), geographic areas, or other selectable report criteria. In this regard, the present inventors recognize that lower report production costs may be obtainable by reducing data processing costs (e.g., processing time, maintenance, and training) through controlling the amount of sequential processing of data. The present invention is based in part on the idea that data processing costs may be significantly reduced by processing a non-linked, sequential data file containing the report data to create one or more relational database files containing only a limited number of index fields in each record. The computing system may then process the relational database file(s) to selectively retrieve information from the larger sequential data file without further sequential processing. Also in accord with the present invention, report production costs may be lowered by monitoring operation of printers and processing equipment (e.g., mechanical inserters) within the report production facility and by then transmitting report output files having a content related to monitoring results. In this manner, the computing system of the present invention is preferably operable to dynamically control the content of report output files to support the efficient operation of the report production facility. Further, the present invention recognizes that lower distribution costs may be obtained by controlling the content of report output files transmitted to the report production facility for use in printing the reports. Distribution costs may be improved by grouping the reports by delivery system classifications (e.g., postal pricing classifications) that are discounted in the rate charged per delivered report. In this regard, the computing system has the capability to selectively retrieve report data having carefully chosen indexes, such as U.S. Postal Service pricing classifications, due to the present invention's combined use of the sequential data file and the database file containing indexes selected specifically to reduce delivery costs.

Accordingly, the present invention is directed to a method for use in operating a report production facility that is operable for preparing information reports and to a computing system configured for utilizing this method of operation. Although the present invention may have various applications, it is particularly well-suited to application in the bill production and distribution field. In the bill production field, processing centers typically collect, store, process and store billing information on each customer (e.g., report recipient) within a given geographic region. This billing information (e.g., report data) is then generally transmitted as non-linked, lines of formatted data (e.g., report data) to a computation center for further processing and transmittal to a report production facility. As may be appreciated, the computation center may be capable of receiving and processing report data from more than one processing center and of communicating with more than one report production facility. In this regard, the computing system of the present invention is typically located at, or is in communication with, the computation center.

Further, the method of the present invention generally includes the following steps: (1) defining a set of fields (e.g., output index fields) for storing processing information from the report data for each report recipient; (2) receiving the report data; (3) sequentially storing the report data in a report recipient file; (4) processing the report recipient file to retrieve the processing information and store the information in the output index fields contained in index records of a report index database file; and (5) creating a report output file for use by a report production facility by processing the report index database file and then selectively retrieving report data from the report recipient file based on the results of processing the report index database file. In this manner, the present invention improves control of the content of the report output by allowing the selective retrieval, i.e., without sequential processing of the report recipient file, of report data based on information stored in a specific database field.

According to one aspect of the present invention, a method of operating a report production facility with improved data processing costs is provided. The method involves creating a subset of information from detailed information stored in a non-relational, sequential data file. The subset of information is then processed to facilitate selective retrieval of particular detailed information from the data file without sequentially processing the data file. The processing of the smaller subset of information and selective retrieval may significantly reduce the time required to retrieve desired detailed information. This time saving is especially pronounced when the data file is large enough to contain detailed information associated with millions of customers (e.g., report recipients) and when the memory required for each customers detailed information is significant. For example, the storage of each customer's information may require 12,280 bytes per record line with multiple record lines resulting in records requiring hundreds of thousands of bytes. Once retrieved, the detailed information may be configured (e.g., placed in Advanced Function Presentation (AFP) or other print image formats) for use by a report production facility and then transmitted in a batch file to that facility for printing information reports.

As may be appreciated, the subset of information may be stored in various formats with one preferable format being the storage of the information in fields of records within a relational database. In this regard, the database preferably includes one record associated with each report recipient to contain the specific subset of information. The use of a relational database allows the subset of information to be more quickly searched as queries may be further narrowed to only search in specific fields within each record. When a query locates information in a specified field, selective retrieval is achieved by accessing information in a storage position data field (e.g., a field in the record containing the name and/or location of the detailed information within the data file) to directly access the detailed information corresponding to that report recipient. In the above manner, the present invention improves data processing costs by significantly reducing processing time.

In a related aspect of the present invention, the choice of what information to store in the fields of the relational database is based on the goal of optimizing distribution costs. Information reports may be delivered through various delivery systems, including Internet communication services, private parcel delivery services, and the U.S. Postal Service. As may be appreciated, each of these delivery systems may offer discounted delivery rates for items presorted into certain classifications. For example, the U.S. Postal Service offers, a lower rate (e.g., Carrier Rate) on mail pieces sorted into a specific carrier route than offered on mail pieces sorted based on a specific 5-digit zip code. However, mail pieces sorted on a specific 5-digit zip code will be less expensive to deliver than mail inserted on a specific 3-digit zip code. In this regard, the U.S. Postal Service passes on its reduced sorting costs to mail pieces pre-sorted into these discounted postal pricing classifications.

Accordingly, the present invention includes the step of processing the data file to classify each report recipient and related detailed information into a specific delivery system's discounted pricing classification. For delivery by the U.S. Postal Service, one field of the record of the database file includes postal pricing classifications. These classifications include special routing, heavy mailing, foreign mailing, carrier route, 5-digit zip code, and 3-digit zip code. Each of these classifications corresponds to a different delivery cost. To obtain lower rates, the method of the present invention processes the detailed information of the data file to determine the postal classification and stores this processing information into the postal classification field of the records associated with each report recipient The records of the database file are then processed by the postal classification field to identify report recipients belonging to each pricing classification and to then selectively retrieve the detailed information from the data file. As may be appreciated, this pre-sorting by the computing system reduces distribution costs per report. Additionally, pre-sorting facilitates efficient operation of the report production facility as certain postal classifications, such as special routing and heavy mail, may require unique processing by insertion stations.

In a further related aspect of the present invention, the choice of which information to store in the fields of the relational database is based on the goal of efficiently operating the report production facility. In this regard, the present invention includes the step of transmitting a report output file to a report production facility. The report production facility may have various stations for producing hard copies of the information reports. These stations may include printers, mechanical or automated inserters, and non-mechanical inserters. As may be appreciated, the inserters receive the printed copies of the reports and insert the reports into appropriate envelopes for transfer to a delivery system. To optimize the operation of these stations, the present invention recognizes the desirability of storing information indicating which printers and inserters will be used to prepare each report for distribution.

Accordingly, the present invention includes the step of processing the data file to determine which print and inserter stations can be used to prepare a report for each report recipient. The print stations may be configured for printing certain output formats or may be readily adaptable to printing a range of formats. Similarly, the inserters may be configured to insert a specific page length (e.g., one-page reports) or a range of pages. The non-mechanical inserters generally will be employed when the report length exceeds the capacities of the mechanical inserters. This retrieved information is then stored in the corresponding report recipient record in the database file in a printer field (e.g., output format field) and an inserter field (e.g., report length field). With this information stored in fields, the database file may be queried by field to identify report data that can be transmitted to the report production facility to optimize use of the printers and inserters, i.e., transmit report data to utilize a printer or inserter that is currently not in use. In addition, the report production facility may include a station for inclusion of informational or advertising flyers. These are generally standard flyers that are included with reports to all report recipients in a production run or to a specific group such as all report recipients living in a given geographic area. To facilitate operation of the flyer insertion station, a field may be included in each record to identify which, if any, flyers are to be added to each information report. The addition of this field allows reports to be grouped based solely on flyer inclusion information.

In a still further related aspect of the present invention, information is stored in the fields of the relational database on other business-defined criteria. The present invention combines the use of a large, non-linked flat file with a relational database to provide great flexibility and control in selectively retrieving report data and then producing information reports from this select detailed information. As can be appreciated, the information reports may be grouped based on a very diverse range of information. When the information reports include billing information, it may be desirable to group the reports or bills based on, for example, bills over a specific dollar amount, bills for customers in a certain state or geographic area, bills for a certain business, and bills for a certain billing cycle. In this regard, the method may include steps for processing the data file to retrieve information related to these criteria and for storing the information in fields in the database file. Again, the inventive method allows the database file to be quickly searched for each of these criteria and then directly retrieve detailed information from the larger data file. This detailed information is included in a report output batch file that is transmitted to a report production facility that produces the group of reports based on the specific search criteria As can be appreciated, this selective grouping and direct retrieval improves the flexibility of information report production while controlling or reducing data processing costs.

According to another aspect of the present invention, a method is provided for continually monitoring or tracking the number of records contained in a database file that correspond to specified grouping categories. As may be appreciated, it may often be desirable to track the number of information reports that could be produced if the database file were queried based on a specific grouping category. For example, the U.S. Postal Service provides for discounted delivery rates for mail pieces pre-sorted into carrier route, 5-digit zip code, or 3-digit zip code classifications. To receive the discounted rate, a minimum number of mail pieces is required for each classification, such as 150 mail pieces for the 3-digit zip code classification. It may also be desirable to transfer report data to the report production facility upon reaching a minimum number of report recipients for other grouping classifications, including page length (to thereby efficiently use inserters), geographic destination, and billing business. Further, if more than one report production facility is being operated by the computation center of the present invention, it may be desirable to track report data for shipment to each facility and to transfer data when a minimum number of reports in a specific category (e.g., a 3-digit zip code area) is received for a specific report production facility.

Generally, the method of the present invention includes sequentially storing detailed information pertaining to a number of report recipients in a flat data file. This data file is then processed to create an index database file which includes a record for each report recipient. Each record has a plurality of index fields for storing portions of the detailed information including the location of the detailed information in the data file. The index fields may then be queried to identify or group report recipients into desired report classifications (e.g., postal classification, report lengths, geographic area, and billing business). The present invention may further include the step of tracking or counting the number of each report classification as records are added (upon receipt and storage) to the index database file and as records are deleted (upon transfer to the report production facility) or marked as "report complete" without deletion. The counting information may be stored in memory in a variety of forms. One preferable storage method is to store the counting information in a database file having a separate field for each report classification.

As may be appreciated, the database file may contain one record or may be configured to include several records. For example, several records may be desirable to store counting information for each report production facility, billing cycle, and billing business. The counting information may then be queried to determine if a minimum number has been reached without processing the larger index database file, thereby reducing data processing costs. Further, the computing system of the present invention may be configured to issue flags to an operator and/or scheduler upon reaching a minimum number in a report classification or be configured to automatically initiate information transfer to a report production facility upon a minimum number being reached for certain report classifications. In the above manner, each of the above embodiments of the present invention allows distribution costs to be controlled by meeting postal classification minimum numbers, increases control of the report production facility by increasing the flexibility in selecting reports to be produced, and increases the efficiency of the data processing system by reducing processing times.

In yet another aspect of the present invention, the method provides for dynamic control of the production facility to increase the efficiency of information report production. The present invention recognizes the desirability of having the capability of selectively transferring report data to a report production facility to better utilize report production equipment and processing stations at the facility. For example, the report production equipment may include printers, mechanical and non-mechanical inserters for inserting printer reports into envelopes, and other processing equipment (e.g., postal meters, bundling equipment, and sorters). This equipment may include equipment having varying configurations and/or capabilities making it well-suited for specific inputs. In this regard, the printers may be configured to print reports having a specific output format, and the inserters may be configured to insert printed reports having a specific page length.

As may be appreciated, it is desirable to have the capability to dynamically (e.g., on an ongoing basis) control the input to these devices. In this regard, the method of the present invention provides for a communicative link between the report production facility and the computing system. In this manner, the report production facility can transmit information regarding the input capacity of each device (e.g., printers and inserters). Additionally, this link allows the report production facility to notify the computing system when certain devices relating to production capabilities are not operative due to maintenance or other difficulties. The communications may be initiated by report production facility personnel via phone or interconnected computing systems or initiated by automated monitoring equipment directly linked to the computing system. The computing system may then be utilized either manually by operator instruction or automatically by programming to selectively transfer report data in a report output file created in response to the received notifications of input capacities and operability. For example, the report production facility may notify the computing system that an inserter(s) capable of inserting reports that are seven pages in length is not being used. The computing system can then create a report output file using the index database file and/or the counting database file (discussed above) containing reports having a length of seven pages. As can be appreciated, improved utilization of the report production facility improves both the overall cost of report production and the time required to produce a given number of reports.

In a related aspect of the present invention, the computing system includes a scheduler to control creation of report output files and transfer of these files to a report production facility. The scheduler functions to choose, on an ongoing basis, a report classification for use in selectively retrieving detailed information, or report data, from the flat data file. This report classification is then used to process the index database file to obtain the storage position of the detailed information. The detailed information is then processed for printing and placed in a report output file for transmittal to the report production facility. The scheduler may be fully-automated so as choose the report classifications based on information received from the communicatively-linked report production facility and/or based on information retrieved or received (e.g., flags) from the counting database file (discussed in detail above). For example, the scheduler may respond to flags, such as 150 records containing the same 3-digit zip code, to choose the report classification and to initiate creation of a corresponding report output file. Similarly, the scheduler may respond to communications from the report production facility requesting reports having a certain length or output format. In this case, the scheduler may first query the index database file or counting database file to verify that a predetermined number of reports are ready for printing before creating a report output file. As can be appreciated, the scheduler may operate on an ongoing basis in communicating with the report production facility and querying the database files to dynamically control the creation of report output files. In addition, the scheduler may communicate with personnel, i.e., operators, to allow interactive scheduling. This interaction between an operator and the scheduler allows the operator to readily select a report classification, such as all bills for a specific business, for report production. In this manner, the scheduler provides continuing control of the report production facility and increases efficient use of report production facility equipment.

It should be understood that more than one report classification may be used in grouping the report recipients to be included in a report output file. For example, the report output file may include report recipients in a specific carrier route with a bill length of four pages that also require a specific informational flyer to be included. It is also within the spirit of the present invention to vary the number of index fields to include processing information that is relevant to a particular delivery system, the equipment within a report production facility, and numerous data processing concerns. From the above discussion, it is apparent that the method of the present invention provides for great flexibility in selecting and controlling the production of information reports, thereby facilitating improved control over distribution and production costs.

DESCRIPTION OF THE DRAWINGS

For a more complete understanding of the present invention and its advantages, reference is now made to the following Detailed Description and the included Drawings of which:

FIG. 2 is a block diagram of a first relational data structure utilized by the computing system of FIG. 1.

FIG. 3 is a block diagram of a second relational data structure utilized by the computing system of FIG. 1.

DETAILED DESCRIPTION

The method and apparatus of the present invention, as implemented in connection with the computer architecture described in detail below, is useful in applications in which large amounts of data are processed to prepare information reports. In particular, the present invention is advantageous in applications that require memory intensive processing of non-linked, formatted information, such as billing information (e.g., report data) relating to a large number of customers. This information is further processed by the present invention to facilitate preparation of an information report for distribution by a delivery system to each customer (e.g., report recipient). As will be appreciated from the following description, the present invention is advantageous in the context of preparing and distributing information reports, such as bills and advertising, through the U.S. Postal Service. In this context, the present invention is useful in reducing processing and distribution costs and in controlling operations of report production facilities which produce (e.g., print, sort, and insert the reports in envelopes having the appropriate postage) the information reports for later distribution. In this regard, the following description is set forth in the context of a program for controlling operation of a report production facility that produces information reports (e.g., bills) for distribution via the U.S. Postal Service. It will be appreciated, however, that various aspects of the invention have broader application, such as distribution through other delivery systems, and the following description is not intended to limit the scope of the included claims.

Figure 1:
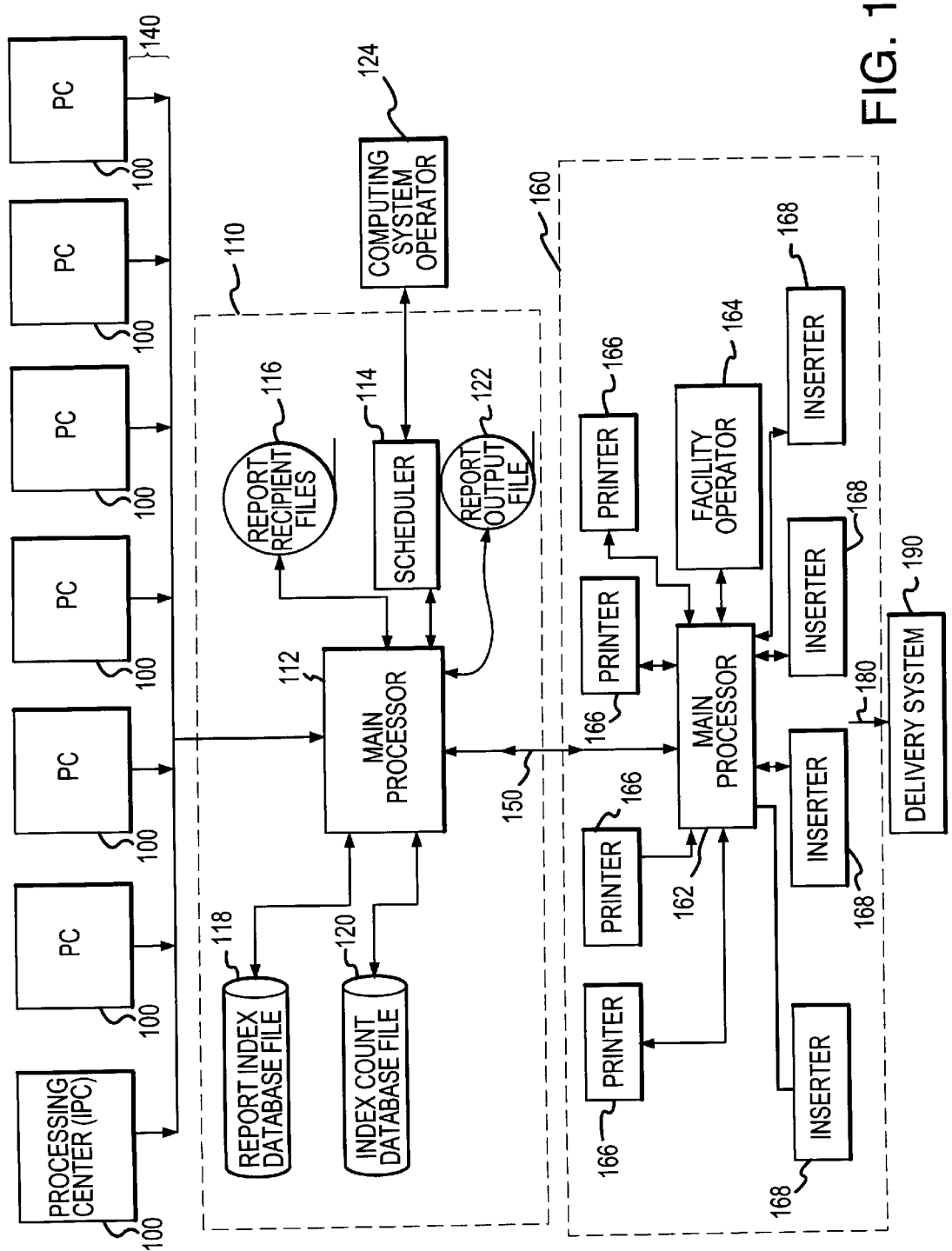
FIG. 1 is a schematic diagram of an operating system for use in producing information reports.

FIG. 1 illustrates a network of facilities communicatively linked to collect, store, and process report data to control production and distribution of information reports in accordance with the present invention. Generally, the network of facilities includes processing centers 100 for collecting report data, a computing system 110 for receiving and processing report data received from the processing center 100 and for controlling operation of a report production facility 160, and a delivery system 190 for delivering produced information reports to report recipients. FIG. 1 further shows communication links between the various components at each facility and shows communication links 140 and 150 and a report transfer system 190 between remotely located facilities.

Generally, each processing center 100 collects data associated with report recipients (e.g., the customers of a business) for a specific geographic region, such as a three-state area in the United States, and is located within that geographic region. As can be appreciated, the number of processing centers 100 may vary depending upon the number of customers in each region, the capacities of the processing centers 100, the availability of communication services, and other factors. During operation, each processing center 100 will collect, process, and store information, such as billing information for telephone calls or credit transactions, pertaining to report recipients on a client list and/or within its geographical region. Because the number of report recipients may be very large, the report recipients are often divided into different groups or billing cycles to reduce the storage capacity needed at each processing center 100 and to more evenly distribute information report production by the report production facility 160 (described in more detail below).

In this regard, the processing centers 100 periodically, such as weekly, transfer report data collected during the past month or other billing period for a selected group of report recipients to the computing system 110. The report data is generally transmitted as sequential lines of formatted data including all the necessary information to print and distribute each information report. The type and amount of information collected depends upon the needs of the businesses and activities being reported on, and the memory needed to store report data for each report recipient may range in size from 0 to 12,280 bytes or more (i.e., many record lines each requiring 12,280 bytes). Generally, the collected information includes an account number or identifier, a distribution address including, if available, a carrier route, 5-digit zip code, or 3-digit zip code, and a media type (e.g., output format for each report). The information may also include sales and/or use transactions for the report recipient, a billing business identifier, the billing amount, and the page length of the report. As will become clear from the following description, the above listed information may be utilized in processing and sorting the report data and in efficiently operating the report production facility 160.

As illustrated in FIG. 1, the processing centers 100 are in communication with the computing center 110 via a communication network 140. As may be appreciated, the communication network 140 may be any public or dedicated, communication system (e.g., telephone lines) capable of transferring computer formatted data. As illustrated, the computing system 110 includes a main processor 112, a scheduler 114, memory for storing report recipient files 116, a report index database file 118, an index count database file 120, and a report output file 122. The main processor 112 is linked to each processing center 100 to receive report data and is operable to process the received report data into report output files 122. Initially, the main processor 112 stores the received report data in sequentially accessible, report recipient files 116. As may be appreciated, sequential access storage may be desirable because the report data for each report recipient is variable in size, for example 0 to 100,000's of bytes, and the amount of memory required for each billing cycle may be large, i.e., many gigabytes (e.g., 10 gigabytes or more).

The present invention recognizes the desirability of selectively producing and distributing reports associated with certain groups of report recipients to improve management of operation of the report production facility and to obtain discounted or lower delivery rates. However, sequential processing costs may make processing costly due to the large number of report recipients and the quantity of report data per report recipient. With sequential or batch processing, every report recipient file 116 is processed to locate report recipients having specified sorting information. To reduce processing costs, the present invention uses relational databases (e.g., report index database file 118 and index count database file 120) in combination with the sequentially accessible report recipient files 116 and report output file 122. This combined use allows the main processor 112 to query either database file 118 and 120 to efficiently identify report recipients having specified sorting information. The main processor 112 then uses positional information (e.g., the starting location of the file and the offset) stored in the report index database file 118 to locate that report data in the report recipient files 116, selectively retrieve the report data, and transfer the report data to the report output file 122. The report output file 122 is then transmitted to the report production facility 160 for batch processing to produce the information reports.

In this regard, the report production facility 160 includes a main processor 162, a facility operator 164, printers 166, and inserters 168. The main processor 162 is linked via communication network 150 to the mainprocessor 112 of the computing system 110. This link allows the computing system 110 to control operation of the report production facility 160 by transmitting report output files 122. The main processor 162 then transmits the report output file to a printer 166 for printing. The main processor 162 selects the printer 166 based upon availability and capability, i.e., ability to print certain report formats. The printed information reports are then transferred to an inserter 168 for insertion into an envelope prior to distribution. The inserters 168 include non-mechanical insertion stations and mechanical (e.g., automated) insertion equipment. The mechanical insertion equipment generally is configured either for insertion of a single page report or for insertion of a range of report lengths such as two to nine pages. Reports over a known maximum page capacity of the mechanical insertion equipment are inserted by the non-mechanical inserters 168.

Referring to FIG. 1, the report production facility 160 includes the facility operator 164 (e.g., operating personnel) for monitoring operation of the report production facility 160 and, when necessary, controlling operation of the various components by communicating with the main processor 162 via standard I/O devices. As illustrated, the main processor 162 is linked to the printers 166 and inserters 168. This link allows the main processor 162 to monitor the operations of each piece of equipment. Particularly, the main processor 162 may be operable to monitor which printers 166 and inserters 168 are available for additional input or work. This availability information may then be used by the facility operator 164 and by the interconnected computing system 110 in preparing the report output file 122 (to be discussed in detail below). It should be understood that the method of the present invention is applicable to controlling more than one report production facility 160, and that only one facility was illustrated for clarity.

After completion of the insertion process, the report production facility 160 then transports the information reports to a delivery system 190 via a report transfer system 180 (e.g., trucking service) for distribution to the report recipients. As noted above, although the present invention is applicable to varied distribution methods, the inventive method is particularly advantageous when the delivery system 190 is the U.S. Postal Service. In this regard, the U.S. Postal Service charges a range of delivery rates depending on size, weight, address (e.g., national or international), and amount of sorting required by the U.S. Postal Service. For example, discounted rates are offered on mail pieces sorted into 3-digit zip code areas, 5-digit zip code areas, and carrier routes, with mail pieces being sorted into a specific carrier route receiving the largest discount. Additionally, the U.S. Postal Service typically requires a minimum number of mail pieces be in each sorted group. For example, there may be a requirement that to obtain a discounted rate for 3-digit zip code sorting that there are at least 200 mail pieces. To meet the goal of reducing delivery costs, it is desirable to both group the report recipients by delivery area and to track or count the number of report recipients in each postal category of interest.

In this regard, the main processor 112 is operable to sequentially process the report recipient files 116 to retrieve a select subset of information for each report recipient and store the information in index records in the report index database file 118. The selection of the information to retrieve during this processing may be based on various factors including sorting efficiency, customer requirements, and cost considerations (e.g., controlling postal rates and data processing time and efficiently operating the report production facility 160). For example, customers (e.g., the billing businesses) may periodically require that all their bills over a certain dollar amount or from a certain state be distributed. Based on these two factors, indexes would be created to contain information regarding the billing companies, the bill total in dollars, and the state of residence of each report recipient.

Similarly, the report index database file 118 may be configured to reach the cost reduction goals of obtaining lower delivery rates and efficiently controlling operation of the report production facility 160. With cost reduction goals being prominent, FIG. 2 illustrates an embodiment of a data structure for each index record in the report index database file 118. The index database file 118 would contain an index record for each recipient. As the report recipient file 116 is processed, the main processor 112 transfers information to the appropriate fields in an index record corresponding to each report recipient. As illustrated, each index record contains the following fields: an account number field for holding report recipient identifying information, a storage position data field for holding information necessary to locate the detailed report data from the report recipient file 116, a postal category field for information regarding the U.S. Postal Service delivery area or route, an output format field for information detailing the format or media type for the printed report, a report length field for page length information, a state field, and a transmittal verification field for marking the record and corresponding detailed report data as copied to the report output file 122.

As may be appreciated, once the information is placed in these index fields, the main processor 112 may be operated to query the database to locate all report recipients, for example, with a specific carrier route or with a specified report page length. Next, the main processor 112 may locate and selectively retrieve detailed report data from the report recipient files 116 using information in the storage position data field. This retrieved information can then be transferred to the report output file 122 for later transfer to the report production facility 160. In this manner, the amount of sequential processing of the large report recipient files 116 is reduced. Further, the selective control of the content of the report output file 122 is improved as the main processor 112 may be operable to group report recipients by a variety of index values and index fields. As noted above, the number and content of the index fields may be altered to better suit the demands of the specific delivery system, the report production facility, and customers requesting the production of information reports.

As the size of the report index database file 118 increases, it may be desirable to have the ability to track information being entered and deleted so as to reduce the number of times the report index database file 118 is processed, i.e., reduce processing time and costs. For example, it may not be efficient to group report recipients having a report length of one page or report recipients residing in a certain state until there are a minimum number of such recipients. Similarly, it is desirable, as noted above, to count the number of report recipients in specific U.S. Postal Service delivery areas to determine when the minimum number of mail pieces for that discount category has been reached. In this regard, the present invention includes the index count database file 120 which includes at least one index count record for containing tracking information for each category of interest. More than one index count record may be included to keep separate counts for each billing cycle, unique geographic areas, and each operated report production facility 160. Additionally, the categories that are counted may be chosen based on many factors and may include delivery discount categories, geographic categories, report format categories, billing or sending business, and report length.

FIG. 3 illustrates a data structure of an index count record in accordance with the present invention. This data structure is specifically useful in grouping by delivery discount categories and by capabilities of the inserters 168 of the report production facility 160. As shown, each index count record in the index count database file 120 includes two report length index count fields (e.g., one page and two to nine pages) and several index count fields for tracking U.S. Postal Service delivery categories. Although only two of each category are illustrated in FIG. 3, an index field is preferably included for each carrier route or zip code classification that is to be tracked by the computing system of the present invention. The report length fields are based on the capabilities of the inserters 168 so as to count the number of reports that could be included in a report output file 122 and transferred to the report production facility 160. In this manner, the main processor 112 may query the report production facility 160 to determine the current input needs (e.g., are any printers 166 and/or inserters 168 idle or nearly so) and/or receive input from the facility operator 164 requesting reports having a certain length. The main processor 112 may then query the index count database file 120 to determine the number of reports that are in the report index database file 118 with the desired report length. If the number is above a predetermined minimum number (selected for processing efficiency), the main processor 112 may then locate the corresponding records in the report index database file 118 by searching the report length field and then selectively retrieve the detailed report data from the report recipient files 116 to create a report output file 122. Similarly, the main processor 112 may query the index count database field 120 to determine which postal categories have at least the minimum number required to receive a postal discount or a number required for processing efficiency. As can be appreciated, the use of a second database file for tracking the total number of reports in specific categories significantly improves processing complexity and time. Further, the use of the second database file facilitates efficient operation of the report production facility 160 by transmitting report output files 122 that contain reports coinciding with the input capacity of the report production equipment.

As illustrated in FIG. 1, the main processor 112 may be operated by a scheduler 114 (e.g., a program run on the main processor 112 or on a separate CPU that is communicatively linked). The scheduler 114 may function to operate the main processor 112 to periodically query the report production facility 160 and the index count database field 120 to readily determine which criteria (e.g., output value) for grouping report recipients is to be employed. For example, the scheduler 114 may have the main processor 112 query the index count database field 120 to identify the postal categories that are above established minimum numbers. The scheduler 114 may then operate the main processor 112 to retrieve each category by processing the report index database file 118 and the report recipient files 116 to create report output files for each category. As another example, the scheduler 114 may have the main processor 112 query the report production facility 160 to determine which inserters 168 are the least busy, i.e., have the most input capacity. Based on this information, the main processor 112 may query the index count database field for the number of reports having a corresponding report length. If that number is above an established minimum, the main processor 112 may process the report index database file 118 and the report recipient files 116 to create report output file(s) 122 to transfer to the report production facility 160. In this manner, the scheduler 114 operates the main processor 112 to efficiently create report output files 122 that make better use of the production equipment at the report production facility 160 and that obtains U.S. Postal Service discount rates. Further, the inventive method of the present invention provides dynamic or real-time control of the data processing operations of the computing system 110. In this regard, the scheduler 114 may be operating the main processor 112 on an ongoing basis to determine which grouping of report recipients will produce the lowest delivery costs and/or efficiently utilize the report production facility 160.

In addition to the dynamic control by the scheduler 114, the main processor 112 may be operated by a computing system operator 124. As can be appreciated, it may be desirable to produce and distribute information reports based on criteria other than lowest postal cost and production capabilities. In this regard, it may be usefull to be able to produce information reports for a certain customer to better meet their schedule or needs. In this regard, the computing system operator 124 may input commands to the main processor 112 via the scheduler 114 with standard I/O devices. For example, a customer may request that all of their information reports (e.g., bills) be distributed for customers residing in a certain state. With this information, the computing system operator 124 instructs the main processor 112 to process the report index database file 118 for all report recipients residing in that state and that are this customer's clients (this may be done by querying the account number field or by including a separate field). As this example demonstrates, this "manual" feature of the present invention provides additional control of the content of the report output file 122.

Figure 4:
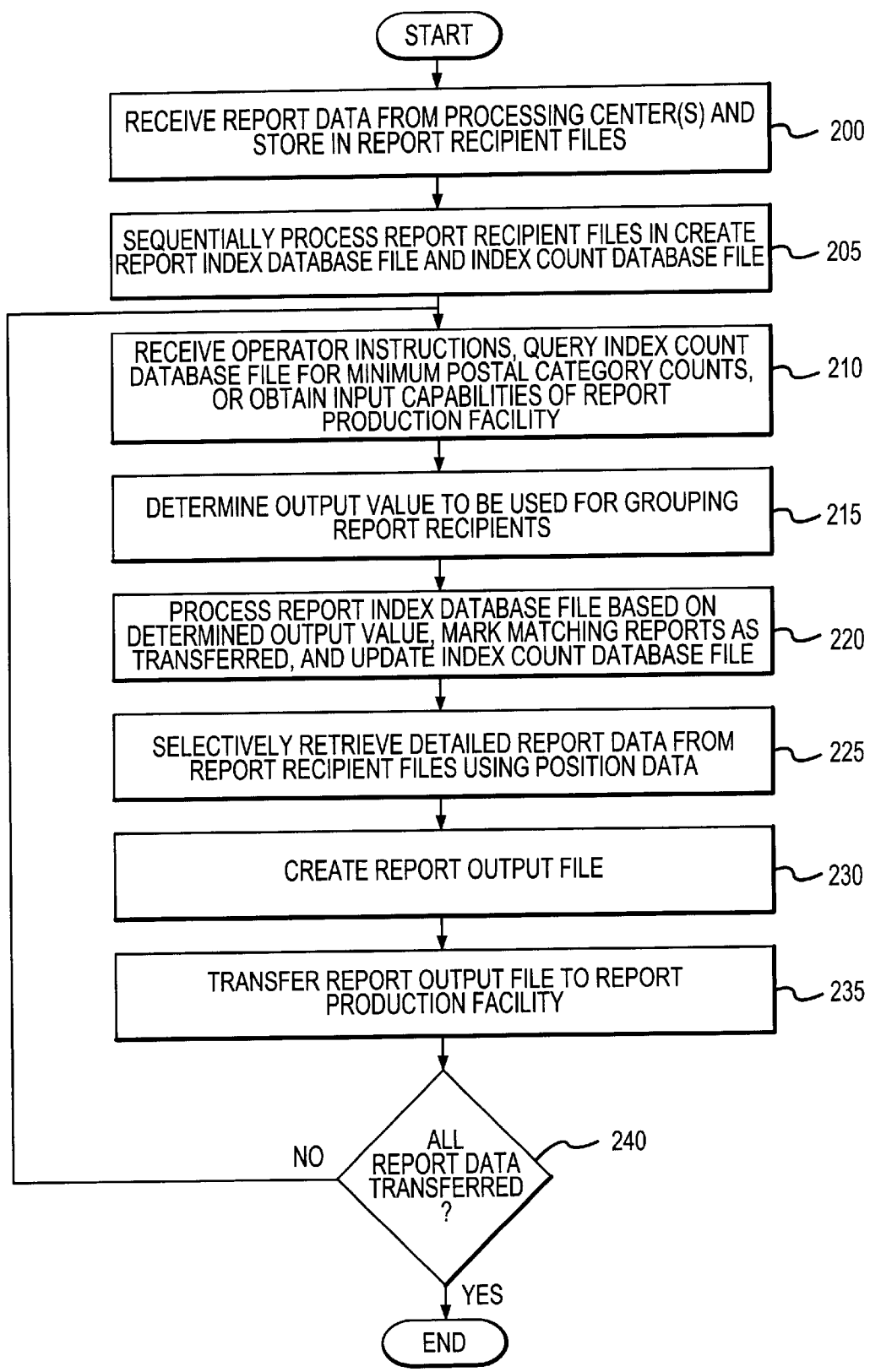
FIG. 4 is a flow diagram illustrating a process implemented in connection with the computing system of FIG. 1.

The following is a specific description of the present inventive method as employed in the context of billing production. In accordance with the present invention, FIG. 4 is a flow chart illustrating a method for processing report data and operating a report production facility(ies). The method is initiated by receiving (200) report data from a processing center(s). The report data is typically received as a stream of non-linked, formatted code containing detailed information associated with each report recipient. The information content may vary but generally includes a report recipient identifier, a billing company identifier, detailed transactional information, delivery address information (e.g., state, zip code, and carrier route), a bill total, the report format, and the report length.

The received report data is stored (200) in report recipient files for later processing into a report output file for use by a report production facility in producing information reports. In this regard, report data may be received for millions of report recipients in each billing cycle and may vary in file size for each report recipient (e.g., 0 to 100,000's of bytes). As can be appreciated, the total amount of report data requiring storage may be very large, such as 10 gigabytes or more. The large amount of data and variability of the file size may make it preferable to employ one or more sequential access storage devices for the report recipient files, with the number of devices used depending upon memory capacities and relative costs of each device.

The method continues by sequentially processing (205) the report recipient files to retrieve a select subset of information for storage in index fields in a report index database file. As can be appreciated, the information stored in the index fields can later be used to sort or group the report recipients by information placed in those fields. Further, the combined use of a relational database and a sequential access file facilitates the use of the database file to locate or identify report recipients having desired characteristics and then selectively retrieving the complete report data from the sequential access file. In this regard, at least one of the index fields contains positional data, such as file name, beginning location, and offset, to allow the file to be directly retrieved without repeated sequential processing of the report recipient files.

The selection of additional index fields is also important in reducing delivery costs and in efficiently operating report production facilities. For example, U.S. Postal Service discount rate categories may be used to group the report recipients so as to obtain discounted rates for pre-sorting mail pieces (as discussed in detail above). Additionally, report production facilities generally include production equipment having limited input and throughput capacities. The production equipment may include printers capable of printing a single or range of output formats at a given rate (e.g., reports per minute). To control operation of these printers, it may be desirable to have index fields indicating the output format for each report recipient to allow grouping of reports on this characteristic. Similarly, the production equipment may include mechanical and nonmechanical inserters capable of inserting printed reports having a specific page length. To operate these inserters efficiently, an index field is included containing report length information. As may be appreciated, index fields may be selected to further additional goals, such as customer convenience which may require a billing business index field.

The sequentially processing (205) step of the method illustrated includes the updating of an index count database file. This database file contains data fields (e.g., index count fields) for storing tracking or counting information associated with select fields of the report index database file. As a record is added to the report index database file, the index count fields will be increased when matching records (e.g., records containing a specified characteristic such as a 3-digit zip code) are stored. For example, the U.S. Postal Service has set minimum numbers of mail pieces for each discount category. Additionally, it may be more efficient to create report output files for a minimum number of report recipients, i.e., 100 or more report recipients. This second minimum number count may be appropriate for report lengths. In this regard, it may not be desirable to create report output files in order to provide input to a specific inserter if there are less than a minimum number of reports to be produced. The inclusion of an index count field for each report length facilitates tracking of the number of reports that could be transferred to the report production facility for printing and inserting. In addition to postal categories and report length categories, the index fields may include billing business fields, state fields, and other fields depending upon the specific report production facility equipment.

The next step (210) of the method includes three substeps. First, a computing system operator may enter instructions via an I/O device requesting that reports having a specific characteristic be produced. The specific characteristic may include all reports (e.g., bills) for a certain billing business, abilling cycle, a state, or a report production facility. Second, the method includes querying the index count database file for minimum postal category counts. According to the present invention, this querying may be initiated by a scheduling program and/or by instructions from the computing system operator. Third, the method includes obtaining input capabilities of the report production facility. This substep may be accomplished by employing monitoring equipment on the production equipment (e.g., printers and inserters) linked to a CPU at the report production facility, which in turn is linked to the CPU of the computing system. Alternatively, the monitoring equipment may be directly linked to the CPU of the computing system or a facility operator may input the availability of the report production facility.

The method continues by determining (215) an output value to be employed in processing the report index database file to group the report recipients. The output value is determined by the CPU of the computing system as operated by a scheduling program. As may be appreciated, the output value is selected based on the information received in the previous step (210) and selected processing priorities. These priorities may be selected on a variety of criteria such as giving customer requests priority, optimizing distribution costs, and optimizing use of report production facilities. The priorities may also be combined, and additional priorities included in scheduling of the creation of report output files. For ease of illustration, the order of the priorities are operator instructions, optimizing distribution costs, and efficient use of report production facility equipment.

In this context, determining (215) the output value is a sequential process. First, any operator instructions are carried out, such as producing all reports for a preeminent billing business which would require an output value of that billing business identifier. Second, each postal category having a minimum postal category count is selected as an output value. Third, the input capabilities of the report production facility are used to create output values. For example, an inserter capable of inserting reports with a one page length may be idle. An output value of report length equal to one will be selected. A further requirement in this case may be that there are more than a minimum, such as one hundred reports, available for production having that report length. This additional requirement would necessitate a query of the index count database file for the number of records having that report length.

As will become apparent, one output value is generally determined each time step (215) is performed. This reduces the concern that reports that were transferred as a result of an earlier processing with a different output value will be counted again during output value determination (215). This problem may occur, for example, if all records for a certain billing business are prepared and then records having a certain postal category are retrieved. The billing business records may include records that also are in the postal category being counted, thereby reducing the number of records in the postal category below the minimum number needed to obtain a discount. By only determining one output value at a time, the method allows the index count database file to be updated prior to determining the next output value.

The output value is then used in processing (220) the index database file to identify report recipient records that contain that output value in a specific index field. Once located, positional data is retrieved, and the record is marked as verified transmitted by updating an index field of the record. After the record is marked as verified transmitted, the index database file is updated by reducing each field which corresponds to that records information. The method continues by selectively retrieving (225) the detailed report data from the report recipient file by using the positional data previously retrieved (220). The positional data contains adequate information, such as file name, starting location, and offset, to allow the report data to be located without sequential processing of the report recipient files. This process is continued until all records having the output value are selectively retrieved.

The retrieved report data is then used in creating (230) a report output file. The report data may require further processing to be utilized by the printers of the report production facility. In this regard, the report data may be placed in Advanced Function Presentation (AFP) or other code appropriate for the particular printers. Upon completion, the report output file is transferred (235) to the appropriate report production facility for production of information reports and distribution to report recipients. The method then repeats (240) steps (210–235) until all report data has been transferred to a report production facility. These steps may be repeated for each billing cycle or may be repeated as long as report data has not been printed into a bill and distributed. Further, it should be appreciated that the method of the present invention is applicable to overlapping billing cycles in which report data is received on an ongoing basis.

While various embodiments of the present invention have been described in detail, it is apparent that further modifications and adaptations of the present invention will occur to those skilled in the art. One modification may be to include another step or substep in the method to process selectively retrieved data to mark each report for the inclusion of an flyer (e.g., informational, advertising, and the like). As may be appreciated, in the mass mailing context, it is often desirable to include a standard or non-unique flyer in envelopes of certain report recipients. The use of flyers allows a billing company to promote new products and to pass along information to report recipients. The billing company may further wish to target a subset of the report recipients, such as all recipients within a geographic area or recipients having total bills over a certain dollar amount. The present method may be adapted to include the function of marking report recipient files for inclusion of a flyer. In addition, other functions may be added to address the functionality of unique equipment and work stations at a report production facility and to address the needs of customers of the computing system (e.g., billing businesses and the like). It is to be expressly understood that such modifications and adaptations are within the spirit and scope of the present invention.

What is claimed is:

1. A method for use in operating a report production facility, said report production facility configured for preparing information reports for transmittal by a delivery system to a plurality of report recipients, comprising the steps of:

defining a set of output index fields for storing processing information useable in said operating of said report production facility;

receiving report data associated with each of said report recipients;

sequentially storing said report data in report recipient files;

processing said report recipient files to create a report index database file including an index record associated with each of said report recipient files, each of said index records including at least said output index fields;

using said processing information stored in said output index fields of said report index database file to create a report output file by selectively retrieving said report data from a selectable set of said report recipient files, said report output file being configured for use by said report production facility in preparing said information reports;

employing a scheduling means to contact said report production facility and determining a capacity of said production facility to receive and process said report output file, and to prepare said information reports.

2. The method of claim 1, wherein each of said information reports has a page quantity value and said output index fields include a report length field for storing said page quantity value for each of said report recipient files.

3. The method of claim 2, wherein said report production facility includes a plurality of inserters, each of said inserters having a page quantity capability for inserting information reports having a corresponding page quantity value into an envelope for delivery by said delivery system to said report recipients.

4. The method of claim 3, wherein said using step includes the following substeps:

determining an input capacity of each of said inserters to receive and insert additional information reports;

comparing each of said input capacities to rank said inserters in descending order based on input capacity; and selectively retrieving said report data from report recipient files having a page quantity value in said report length field corresponding to said page quantity capability of an inserter being ranked as having the largest input capacity.

5. The method of claim 1, wherein said receiving, sequentially storing, processing and using steps are performed at least partially contemporaneously.

6. The method of claim 1, wherein said delivery system is the U.S. Postal Service and said output index fields include a postal category field for storing postal pricing classifications, said postal pricing classifications including special routing, heavy mailing, foreign mailing, carrier route, 5-digit zip code, and 3-digit zip code.

7. The method of claim 6, wherein said using step includes selecting one of said postal pricing classifications, processing said report index database file to locate said index records having said one of said postal pricing classifications in said postal category field, and selectively retrieving said report data from each of said report recipient files corresponding to said located index records.

8. A method for use in operating a report production facility, said report production facility being adapted for preparing information reports from a report output file that includes report data associated with a plurality of report recipients, said method comprising the steps of:

selectively retrieving report data stored in a set of report recipient files by processing a report index database file, said report index database file including an index record associated with each of said report recipient files, wherein said index records include output index fields containing processing information;

creating said report output file from said selectively retrieved report data; and transmitting said report output file to said report production facility for use in preparing said information reports.

9. The method of claim 8, wherein said output index fields include an output format field including information associated with the physical form of said information report, a report length field including a page quantity value, a postal category field including postal pricing classifications, a state field, and a transmittal verification field, said postal pricing classifications including special routing, heavy mailing, foreign mailing, carrier route, 5-digit zip code, and 3-digit zip code.

10. The method of claim 9, wherein said report production facility includes a plurality of inserters having a page quantity capability for inserting prepared information reports having a corresponding page quantity value into an envelope and said selectively retrieving step is performed based on said page quantity value stored in said report length field and a determinable input capacity of each of said inserters.

11. The method of claim 9, wherein said selectively retrieving step includes selecting one of said postal pricing classifications, processing said report index database file to locate said index records having said one of said postal pricing classifications in said postal category field, and selectively retrieving said report data from each of said report recipient files corresponding to said located index records.

12. A method for use in preparing information reports for transmittal by a delivery system to report recipients, comprising the steps of:

providing a first data storage means for storing report data associated with said report recipients, said first data storage means including a report recipient file corresponding to each of said report recipients;

sequentially storing report data associated with each of said report recipients into said report recipient files of said first data storage means;

coupling a data processing means, for processing said report recipient files, to each of said first data storage means, a second data storage means for storing data in database files, a third data storage means, including a report output file, for storing data for transmittal to a report preparation facility, and said report production facility;

creating a report index database file by processing said report recipient files with said data processing means, said report index database file having an index record associated with each of said processed report recipient files and being stored in said second data storage means, wherein each of said index records includes a plurality of output index fields and at least one storage position data field for storing position data, said position data including information for locating, free from sequential searching, said each of said report recipient files in said first data storage means;

creating a report output file for transmittal to said report production facility, wherein the step of creating said report output file comprises the substeps of:

receiving at said data processing means an output value;

operating said data processing means to process said report index database file to locate each of said index records having said output value in one of said output index fields;

locating in said first data storage means a report recipient file associated with each of said index records located in said operating substep, wherein said locating substep is performed by said data processing means by utilizing said position data included in said storage position data field of each of said located index records; and utilizing said data processing means to transfer said report data from each of said located report recipient files to said report output file of said third data storage means; and transmitting, with said data processing means, said report data in said report output file from said third data storage means to said report production facility for production of said information reports and transmittal to said delivery system for delivery to said report recipients.

13. The method of claim 12, said first data storage means configured for storing report data having a variable size into said report recipient files.

14. The method of claim 12, further comprising the step of receiving said report data from a plurality of data processing centers, said data processing centers being in communication with said data processing means and at least one of said data processing centers being located at a location different from said data processing means.

15. The method of claim 14, wherein said report data is received from at least seven of said data processing centers.

16. The method of claim 12, wherein said delivery system is at least one of the U.S. Postal Service, a private package delivery service, and an Internet distribution service.

17. The method of claim 12, wherein said delivery system is the U.S. Postal Service and said output index fields include an output format field including information associated with the physical form of said information report, a report length field including a page quantity value, a postal category field including postal pricing classifications, a state field, and a transmittal verification field, said postal pricing classifications including special routing, heavy mailing, foreign mailing, carrier route, 5-digit zip code, and 3-digit zip code.

18. The method of claim 17, wherein said output value is transmitted from said report production facility, whereby said report production facility is operable to control said report data included in said report output file at least partially as a function of a capacity of said report production facility to receive and process said report data, said capacity being a function of said page quantity value in said report length field.

19. The method of claim 17, further comprising the step of providing a tracking means for determining and storing a current total for each of said postal pricing classifications in said postal category field, said current totals being increased when an index record having one of said each of said postal pricing classifications is stored in said second data storage means and being decreased when an index record having one of said each of said postal pricing classifications is verified transmitted to said report output file.

20. The method of claim 19, further comprising the steps of:

providing a scheduling means for controlling said creation of said report output file and said operation of said report production facility, wherein said scheduling means is in communication with said data processing means, said report production facility, and said tracking means; and utilizing said scheduling means to determine said output value as a function of a capacity of said report production facility to receive and process said report data and of said current totals for each of said postal pricing classifications, wherein said scheduling means compares said current totals for each of said postal pricing classifications with a minimum quantity defined by the U.S. Postal Service for obtaining said each of said postal pricing classifications.

21. The method of claim 19, wherein said tracking means includes an index count database file including a special routing count field, a heavy mailing count field, a foreign mailing count field, a carrier route count field for each carrier route, a 5-digit zip code count field for each 5-digit zip code delivery area serviced by said report production facility, and a 3-digit zip code count field for each 3-digit zip code delivery area serviced by said report production facility.

22. The method of claim 12, wherein said data processing means is coupled to a plurality of said report production facilities.

23. A method for use in operating a report production facility, said report production facility being adapted for preparing information reports for transmittal by a delivery system to report recipients, comprising the steps of:

providing a first data storage means for storing report data associated with said report recipients, said first data storage means including a report recipient file corresponding to each of said report recipients;

sequentially storing report data associated with each of said report recipients into said report recipient files of said first data storage means;

coupling a data processing means for processing said report recipient files to each of said first data storage means, a second data storage means for storing data in database files, a third data storage means, including a report output file, for storing data for transmittal to a report production facility, and said report production facility;

creating a report index database file by processing said report recipient files with said data processing means, said report index database file having an index record associated with each of said processed report recipient files and being stored in said second data storage means, wherein each of said index records includes a plurality of output index fields and at least one storage position data field for storing position data, said position data including information for locating, free from sequential searching, said each of said report recipient files in said first data storage means;

providing a scheduling means for controlling preparation of said information reports by said report production facility, wherein said scheduling means is in communication with said data processing means and said report production facility;

creating a report output file for transmittal to said report production facility, wherein the step of creating said report output file comprises the substeps of:

determining with said scheduling means a capacity of said report production facility to receive and process said report data;

utilizing said scheduling means to determine, as a function of said determined capacity, an output value for use in selecting a plurality of said report recipient files for transfer to said report production facility;

receiving at said data processing means said output value from said scheduling means;

operating said data processing means to process said report index database file to locate each of said index records having said output value in one of said output index fields;

locating in said first data storage means a report recipient file associated with each of said index records located in the operating substep, wherein said locating substep is performed by said data processing means by utilizing said position data included in said storage position data field of each of said located index records; and utilizing said data processing means to transfer said report data from each of said located report recipient files to said report output file of said third data storage means; and transmitting, with said data processing means, said report output file from said third data storage means to said report production facility for production of said information reports and transmittal to said delivery system for delivery to said report recipients.

24. The method of claim 23, said scheduling means being responsive to operator commands enabling an operator to specify said output value.

25. The method of claim 23, wherein said scheduling means substantially continuously performs said determining said capacity of said report preparation facility substep.

26. The method of claim 23, wherein said information reports have a plurality of output formats and a plurality of page quantity values and said report production facility includes a plurality of printers adaptable to print said information reports in each of said output formats and a plurality of inserters for inserting said printed information reports into envelopes for delivery by said delivery system, each of said inserters having a page quantity capability for inserting said printed information reports having a corresponding page quantity value.

27. The method of claim 26, wherein said determining said capacity of said report production facility to receive and process said report data substep includes determining a capacity of each of said printers to receive a report output file and determining an input capacity of each of said inserters having a particular page quantity capability.

28. The method of claim 27, wherein said determining said capacity of said report production facility to receive and process said report data substep further includes monitoring an operating status of each of each of said printers and each of said inserters.

29. The method of claim 27, wherein said data processing means is in communication with said printers of said report production facility, said transmitted report output file includes report data having an output format, and said transmitted report output file is received by one of said printers adapted to print said output format of said report data.

30. An apparatus for processing report data associated with report recipients to create a report output file, said apparatus comprising:

input means for receiving said report data related to each of said report recipients;

memory means for sequentially storing said report data in report recipient files and for storing at least a portion of said report data in a report index database file, said report index database file including an index record associated with each of said report recipients, wherein said index records include output index fields for storing said at least a portion of said report data;

data processing means for processing said report recipient files to retrieve said output index fields in said index records, said data processing means further being operable to compare said output index fields in said index records, said data processing means further being operable to compare said output index fields to a receivable output value so as to selectively retrieve said report data is transferred to said report output file; and a scheduling means for controlling preparation of said information reports by said report production facility, wherein said scheduling means is in communication with said data processing means and a report production facility, where said scheduling means is further configured to:

determine a capacity of said report production facility to receive and process said report data; and determine, as a function of said determined capacity, and output value for use in selecting a plurality of said report recipient files for transferred to said report production facility.

31. The apparatus of claim 30, wherein said output index fields include a report length field, a postal category field, a state field, a transmittal verification field, and an output format field.

32. The apparatus of claim 31, wherein said report data stored in said postal category field includes postal pricing classifications including special routing, heavy mailing, foreign mailing, carrier route, 5-digit zip code, and 3-digit zip code.

33. The apparatus of claim 31, wherein said report data stored in said report length field includes a page quantity value.

\* \* \* \* \*